United States Patent [19]

Rice et al.

[11] 4,106,176

[45] Aug. 15, 1978

[54] METHOD AND APPARATUS FOR FASTENER TENSIONING

[75] Inventors: Edwin Eugene Rice, Ann Arbor, Mich.; Walter Carl Vliet, Landing, N.J.

[73] Assignee: Ingersoll-Rand Company, Woodcliff Lake, N.J.

[21] Appl. No.: 785,026

[22] Filed: Apr. 6, 1977

[51] Int. Cl.² .............................................. B23Q 5/00
[52] U.S. Cl. .................................... 29/407; 73/88 F; 173/12
[58] Field of Search ................. 73/88 F, 139; 29/240, 29/407; 81/52.4 R, 52.4 B, 52.5; 173/1, 12

[56] References Cited

U.S. PATENT DOCUMENTS

| | | | |
|---|---|---|---|
| 2,756,622 | 7/1956 | La Belle | 73/139 X |
| 3,974,883 | 8/1976 | Sigmund | 173/12 X |
| 4,026,369 | 5/1977 | Vliet | 81/52.4 B |

Primary Examiner—Charles A. Ruehl
Attorney, Agent, or Firm—Walter C. Vliet

[57] ABSTRACT

A fastener tensioning method and apparatus for obtaining a desired degree of tension in a fastener. The embodiment of this invention described utilizes the slope of the change in torque per change in rotation gradient to predict a rotation starting point independent of the rotation that occured in the torquing cycle up to the point of establishing a constant gradient. In the constant slope or gradient area of the torque rotation curve, rotation is considered linearly proportional to the tension in the fastener. A prescribed additional rotation is applied to the fastener utilizing the threads as a micrometer device for stretching the bolt to achieve the desired tension or fastener strain level. With appropriate system monitoring such as the total rotation, the maximum torque applied, the gradient slope, etc., the system can be adapted to inspect the fastener for applied tension as well as accurately control tension level.

21 Claims, 2 Drawing Figures

METHOD AND APPARATUS FOR FASTENER TENSIONING

BACKGROUND OF THE INVENTION

The trend toward optimizing equipment design to achieve the maximum capability of equipment with regard to weight, size, and economy of material usage have spurred considerable activities in the area of fastener tension and inspection methods. A considerable amount of the early development work centered on torque control as a means of fastener tensioning. However, the accuracy of this method is severely limited by its sensitivity to such factors as thread condition and other factors affecting the coefficient of friction.

To minimize the effect of friction, a later development, often referred to as the so-called "turn of the nut" method, was evolved. The method prescribed a combination of torque (to assure the fastener was seated) and rotation (using the thread of the bolt as a micrometer to stretch the bolt). This method achieves considerable accuracy in tensioning the bolt under carefully controlled fastener and joint system conditions. However, the torque controlled starting point often leads to difficulties by false starts (the fastener or the joint system not properly seated or because of thread condition causing high prevailing torque).

An even more recent development is the method of bringing the bolt to its recognizable yield point, which is a well defined point of tension, and utilizing that point to ultimately arrive at the desired bolt tension either by memory of the tightening cycle or an "unturn of the nut" method. While these later methods result in reasonably accurate bolt tension, the methods have some drawbacks in universal application. In many applications, it is not desirable to bring the fastener to its yield point. The joint may not be capable of sustaining the full tension of a yielded fastener without damage such as flange warpage, gasket crushing, or thread failure.

SUMMARY OF THE INVENTION

The purpose of the present invention is to provide a novel method and apparatus for tensioning a fastener which utilizes a proportionally determined amount of rotation in combination with the determined rate of change of torque with respect to the rotation in the bolt tensioning sequence below the yield point. In the embodiment shown and described, a linear projection of the torque rotation slope is utilized to determine the zero torque intercept of the slope as an accurate definable starting point for measuring rotation of the fastener to predict and accomplish a fastener tension level.

It is a purpose of this invention to eliminate the variables of the joint and fastener torquing sequence occurring prior to the linear portion of the torque rotation slope. Another purpose of this invention is to provide a fastener tensioning system that utilizes the rotation of the fastener to achieve the desired tension by measuring rotation from a zero torque intercept projected from the linear portion of the torque rotation curve after the torque rotation curve has been determined to be linear. It is yet another purpose of this invention to eliminate the need for driving a fastener to its yield point to establish a well defined point in fastener tension from which fastener tension levels may be predicted and achieved.

It is a further object of this invention to minimize the torque power required to achieve a desired level of fastener tension by avoiding the overtightening of the fastener prior to achieving the desired level of fastener tension. These and other objects are accomplished by an apparatus comprising: Wrench means for rotating the fastener; means for measuring a tension-related function applied to the fastener; means for measuring a function of rotation applied to the fastener; means for receiving the measurement of the tension-related function and the measurement of the function of rotation and for determining a rate of change of the tension-related function with respect to the function of rotation; means for determining when the rate of change becomes a constant; a means for determining the rate of change constant; means for establishing the tension-related function zero intercept of the function of rotation based on a linear projection of the rate of change constant determined; means for rotating the fastener a proportionally determined amount of rotation from the tension-related function zero intercept of the function of rotation; and means for stopping the rotation of the fastener in response to the fastener being rotated the proportionally determined amount.

DESCRIPTION OF THE EMBODIMENT

Figure 1:
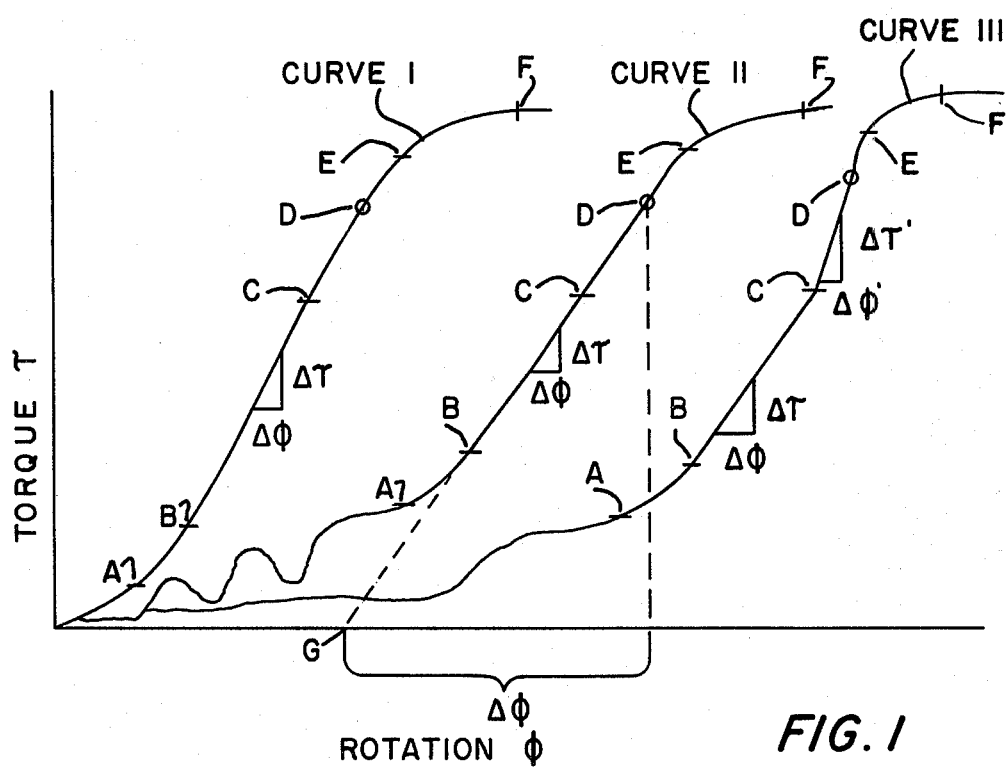
FIG. 1 is a graph showing various typical plots of torque versus rotation for several fastener tensioning sequences.

Reference is made to FIG. 1 which shows a series of typical joint torquing sequences. For purposes of this specification, a joint or joint system may be considered to be the local area of a mechanical assembly in which a threaded fastener is used, usually in tension, for securing two or more parts together. The invention is concerned primarily, but not exclusively, with the tightening of screw threaded fasteners, such as screws, bolts, and nuts. A hard joint is one in which the fastener exhibits a rapid rise in tension or clamping load for a given rotation. A soft joint conversely exhibits a slower rise in fastener tension or clamping load for a given rotation. The hardness of a joint is the function of both the joint stiffness and the fastener stiffness. The terms "hard" and "soft" are used relatively for purpose of the following description. Curve 1 is typical of a well prepared hard joint, in this case the initial torque build up is relatively rapid and constant once established. Of course, the curve could be displaced significantly to the left depending on the length of the fastener and the rotation required to engage the head of the fastener. Curve 2 is typical of a fastener wherein the joint is softer than curve 1 and the threads or the joint itself exhibits erratic torquing during initial tightening. This is created in typical cases by poor or dirty threads, high spots in the bolt face or local yielding of the joint system. Curve 3 is typical of a fastener having a relatively erratic approach to its initial seating, a relatively constant or linear tensioning to a certain point followed by a point wherein the fastener experiences a second relatively constant increase in torque for an increase in rotation. The change in rate may be negative or positive (as shown) due for instance to compound factors in the joint makeup.

For example, the change in rate may result from a soft sealing gasket which bottoms, initial yielding taking place in the joint, or thread yielding creating a false linear gradient. These are just a few of the potential problems which may be experienced in a conventional bolt torquing sequence. One thing, however, appears common to all of these torquing sequences, at some point each enters a relatively linear portion during which the stress in the bolt is considered proportional to the strain or tension in the bolt.

For each of the curves, several points have been identified for purposes of further discussion. Point A is the point at which the rotation has progressed until the joint is just snug; that is, all of the erratic portions or clearances in the joint have been eliminated and further rotation of the fastener will result in appreciable increase in the torque and tension level experienced in the fastener. Point B is the point at which the fastener is entering its proportional range in tension. Point C is an arbitrary intermediate check point, or points, for the purpose of this invention. Point D is the point at which torque or rotation on the bolt yields the desired bolt tension. Point E is the end of the proportional range sometimes referred to as the yield point. Point F is a point at which the bolt is experiencing non-elastic deformation.

It will be noted that in each case of the typical joint tightening sequence, the curve presented for torque versus rotation exhibits a relatively constant slope for at least a portion of the tightening cycle; that is $\Delta\tau/\Delta\phi$ (increment of torque per increment of rotation) becomes a constant K for any one tightening operation. If a relatively constant speed driver is utilized, time may be substituted for the parameter of rotation. Other tension associated parameters other than torque may also be utilized. However, the preferred embodiment herein described will utilize torque as the tension-related parameter because of its relatively common and convenient use for fastener tensioning.

In the past, there have been several attempts as previously described to improve the relationship between applied torque and the resulting tension. In U.S. Pat. No. 3,962,910, several inspection methods are described which improve the reliability of torque as a tension-related parameter. In the method of that patent, if certain predetermined levels of torque occur within predetermined ranges of rotation for a given fastener, after an arbitrarily specified seating torque, then the joint tightening system can be assumed to be operating satisfactorily and a reasonable tension level achieved in the fastener. The system, however, requires predetermination of both the acceptable range of torque and the range of rotation and further assumes a reasonable tension level is achieved within these ranges. The method, however, cannot be utilized to predict or achieve a desired tension level relative to the varying friction and joint conditions encountered in typical fastener applications.

U.S. Pat. No. 3,643,501 introduced a method of determining the yield point of a fastener as it is rotated. This provided a useful gage of fastener tension, in that the yield point of the fastener results from a well defined level of tension in the fastener. This parameter has been utilized in several fastener tension systems as both the final point of tensioning and the starting point for achieving other levels of fastener tension. As previously mentioned, however, this system has the disadvantage of requiring that the fastener and its joint first be stressed to the yield point of the fastener, which in some cases, may not be desirable.

This invention provides an alternative means of determing fastener tension levels and may be utilized to achieve desired levels of fastener tension with improved accuracy over previous "turn of the nut" methods. In this invention, we propose the use of the linear portion (slope) of the fastener torque (or other tension-related parameter) and the rotation (or time) curve and a proportionally determined rotation. Apparatus capable of determining the slope of the torque-rotation curve, and apparatus for measuring torque and rotation are now well known in the art. The electronic component circuitry to accomplish each of the steps of this invention is known in the art. The proportionally determined rotation is based on the stretch of the fastener as an elastic member in a joint system with a constant or known spring rate and the use of the fastener threads as a gage of stretch.

Figure 2:
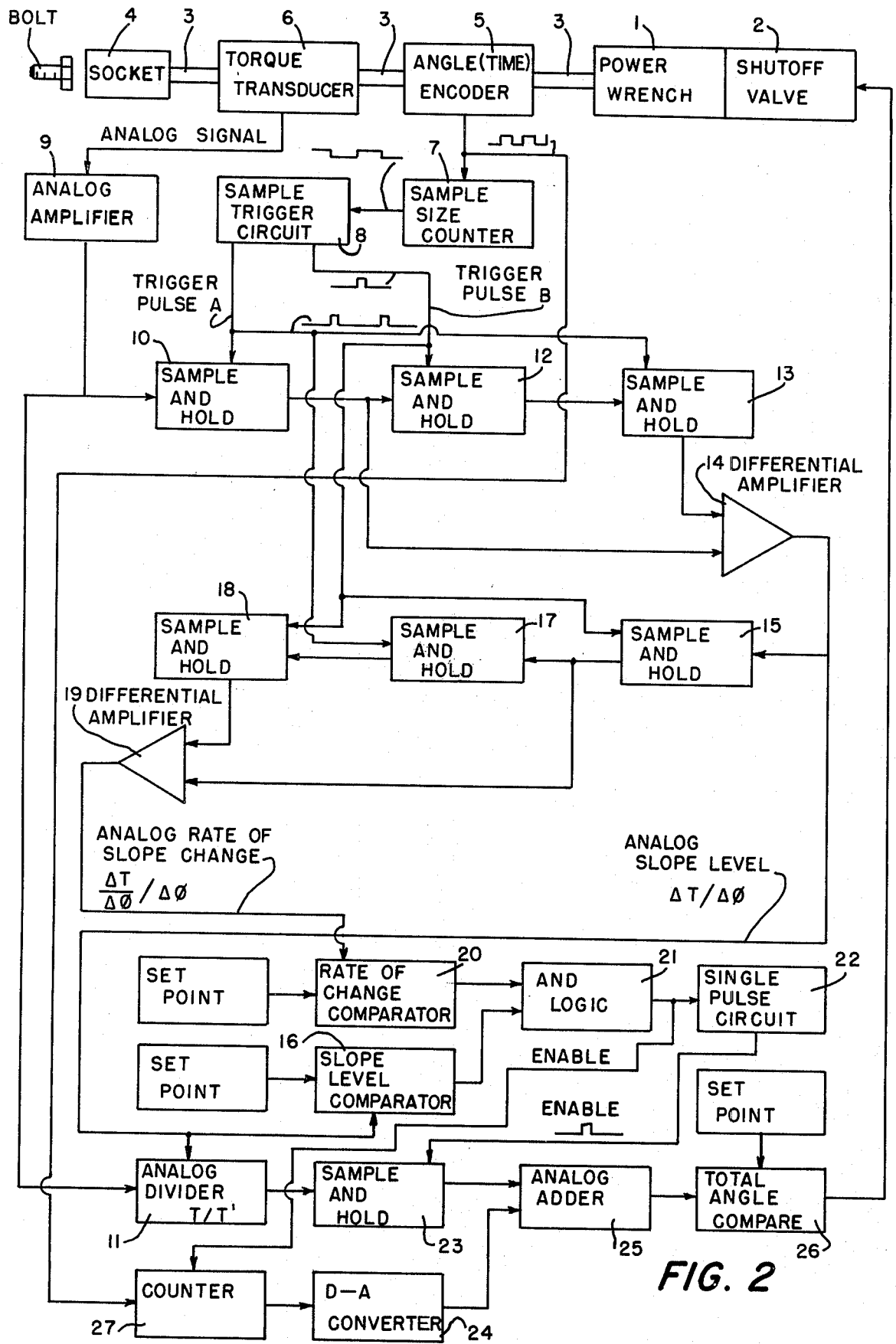
FIG. 2 is a schematic showing the apparatus necessary to accomplish one embodiment of the invention, wherein the slope gradient and applied torque are utilized to accomplish fastener tension.

Referring now to FIG. 2, one embodiment of the invention will be described in detail as an aid to further understanding of the invention. In FIG. 2, a conventional powerdriven wrench 1 is shown. It may be driven by pressure fluid or an electric motor or any other power source. Its function is to provide the rotary driving force required to rotate a threaded fastener.

A power wrench 1 is provided with a shut off valve 2 and has its power output on spindle 3 which in turn rotates a socket 4 for driving a threaded fastener or bolt as shown on FIG. 2. Spindle 3 also rotates an angle encoder 5 for monitoring the rotation of the spindle and drives through a transducer 6 for monitoring the torque output on spindle 3. For purposes of description in this embodiment, angle encoder 5 produces one pulse signal per degree of rotation and the transducer 6 produces an analog signal proportional to the torque on spindle 3. Where the power wrench 1 is a constant speed device, a pulse timer may be substituted for the angle encoder and its pulse output (time) may be utilized in the same manner as the angle encoder pulse output shown on FIG. 2.

The angle encoder pulses are fed into a sample size counter 7 which counts the encoder pulses and changes the signal into one pulse for each preset number of degrees. For purposes of this embodiment, we have chosen 4 degrees as the sample size. The sample size is selected for the type of joint being assembled in order to avoid or mask out noise or insignificant deviations in torque rate. The output of the sample size counter 7 is fed into a trigger circuit 8 which produces a short interval "A" pulse at the leading edge of the sample signal and a short interval "B" pulse at the trailing edge of the sample signal.

The torque transducer 6 signal is amplified by an analog signal amplifier 9. The amplified torque signal is fed into an analog divider 11 and a sample and hold module 10. The instantaneous or present value of the analog torque signal is held in memory by the sample and hold module 10 upon receiving an "A" pulse from trigger circuit 8. The instantaneous torque signal, which is stored in sample and hold module 10, is transferred to a sample and hold module 12 when sample and hold module 12 receives a "B" trigger pulse from trigger circuit 8. The next "A" trigger pulse updates the torque signal stored in the sample and hold module 10, and enters the previous torque sample stored in sample and hold module 12 into sample and hold module 13. The output of sample and hold module 13, therefore, is a previous torque sample that is fed into a differential amplifier 14. The current torque sample stored in sample and hold module 10 is also fed into the differential amplifier 14. The output of differential amplifier 14 is proportional to the torque gradient in relation to rotation as the torque sample fed into the differential amplifier from sample and hold 13 is taken an increment of rotation earlier than the torque sample from sample and hold 10.

In summary, to this point, the alternating trigger pulses "A" and "B" are utilized to trigger the acceptance of an instantaneous analog torque signal and transfer the same to either a subsequent sample and hold module, to accomplish a one trigger pulse period delay, or to a differential amplifier wherein the instantaneous torque analog signal and the prior torque analog signal may be compared to establish a torque gradient signal. The torque gradient signal from differential amplifier 14 is fed into an analog divider 11, a slope level comparator 16, and a sample and hold module 15. In a manner previously described, sample and hold module 15 accepts the torque gradient signal when triggered or gated by trigger pulse "B." Subsequent trigger pulse "A" transfers the torque gradient signal into sample and hold module 17. The following trigger pulse "B" transfers the torque gradient signal stored in sample and hold module 17 into sample and hold module 18. The output of sample and hold module 18 is fed into one side of differential amplifier 19. The same trigger pulse "B" that directs the previous torque gradient sample to differential amplifier 19, also updates the sample and hold module 15 with the current torque gradient sample which is fed to the opposite input of the differential amplifier 19. The differential amplifier 19, therefore, now has an input a previously stored torque gradient signal and a current torque gradient signal. The output of differential amplifier 19 is, therefore, proportional to the torque gradient rate of change which is fed into the rate of change comparator 20.

When the torque gradient rate of change signal fed into the rate of change comparator 20 is less than a previously entered set point, an output logic signal is fed into "AND" logic 21. When the torque gradient signal is greater than a set point for slope level comparator 16, an output logic signal is also fed into the "AND" logic 21 switching logic 21 on and thereby feeding the logic signal to single pulse circuit 22 and to the enable input of counter 27.

The analog divider 11 now has a torque signal as a numerator and torque gradient signal as a denominator producing an output proportional to spindle 3 rotation (fastener rotation) from a zero torque intercept of the torque rotation slope. The output of analog divider 11 is fed into sample and hold module 23 which accepts and stores the signal upon receiving an enable signal from the single pulse circuit 22. At the point in time of the signal pulse from circuit 22, the torque gradient rate of change is less than a preset amount and the slope is greater than a preset amount indicating the torque gradient is now linear and initial clamping has taken place and the rotation from the zero torque intercept is calculated or is determined in magnitude.

An enable signal from "AND" logic 21 into encoder pulse counter 27 starts the counter counting sending the digital count signal into a digital to analog ("D-A") converter 24 producing an analog count signal which goes to analog adder 25. Previous rotation stored in sample and hold module 23 is also fed into the analog adder 25 adding the rotation from the zero torque intercept determined from the linear tightening curve at the time of firing of pulse circuit 22 to the rotation occurring beyond that point. The output of analog adder 25, therefore, is proportional to total rotation of the fastener being tightened from the zero torque slope intercept. The output of analog adder 25 is fed into total angle compare module 26. When the total rotation reaches a preset amount of rotation, module 26 signal is fed to the motor shut off valve 2 thereby stopping the rotation of the spindle, socket, and fastener. The preset amount of total rotation is determined for each fastener joint combination based on either joint experience or the theoretical or experimental determination based on desired fastener elongation utilizing the thread as a micrometer means for stretching the fastener and is herein referred to as the proportionally determined amount of rotation.

The method and apparatus described in the above embodiment is a substantial improvement over the so-called "turn of the nut" method, in that by computing a zero torque intercept and establishing a slope gradient which is proportional to the tension in the fastener in its linear range both the effect of fastener friction before the snug point and subsequent to that point until the fastener is tightened is eliminated.

The proposed method of fastener tensioning may be utilized to establish a starting point for rotation measurement corresponding to the zero torque slope intercept, shown as Point G on FIG. 1, which will be useful for several purposes herein defined.

Once the slope intercept has been established, the assumption is made that for a given fastener joint combination, stretching of the fastener is proportional to rotation (using the thread as in a micrometer) from the zero torque slope intercept G. For a given fastener, a given elongation will result in a certain tension in the fastener using the spring rate of the fastener and the joint. Using the previous assumption, a given change in rotation (rotation of the micrometer threads) results in the desired elongation or stretch of the fastener.

In this manner, a given tension level in the fastener may be achieved without the necessity of bringing the fastener to yield and without the disadvantages of an arbitrary starting point for the "turn of the nut" method. In this case, the starting point is the calculated zero torque slope intercept G as shown in FIG. 1 for curve 2.

It is possible that for one reason or another as previously described, the torque rotation curve may exhibit more than one constant slope. The circuitry of FIG. 2 may be adapted by means of constant or intermittent slope check to detect a change in slope. The slope checker would continuously monitor the slope constant during the entire tightening cycle. Should the constant change once it has been established and the point G calculation made, it could be made to shut off the tightening sequence indicating a possible fault or reestablish the point G calculation with the new constant in situations where initial joint fitup may warrant or where the joint constant is known to change. In addition, the slope constant may be compared to a predetermined range of the constant to determine if the fastener joint system is within the predetermined tolerances as shown in the preferred embodiment.

The change is torque rather than change in rotation may be utilized to project and determine the fastener tension. In the present state of the art, it is sometimes easier to measure torque levels than rotation increment sums. For a given fastener in a seated condition, the increase in torque applied is directly proportional to the increase in tension experienced in the fastener.

Although we have described a method and apparatus for determining the zero torque intercept which determines the approach to linearity by following the torque rotation curve from its starting point, it must be appreciated that it is not necessary to do so to accomplish this invention. For example, it should now be obvious to one skilled in the art that the slope determination and level check may be initiated at any desired torque. For a given joint system, a level of torque may be selected as a starting or threshold torque which could assure the linear portion of the curve being intercepted. The slope could be determined at this or any subsequent point within the linear portion of the curve and a zero torque intercept determined. Shut off would then occur as previously discussed when the proportionally determined rotation had occurred after the zero torque intercept. The advantage of this method is to avoid the signal complexity prior to obtaining a snug joint and possible joint fitup disparities.

Utilizing the methods of this invention, it is possible then to obtain a desired level of tension in the fastener without the necessity of bringing the fastener to its yield point. With appropriate system checks, the fastener may be tightened to a desired level of tension. Utilizing the apparatus of this invention, it is necessary for the user to determine the number of samples of constant slope required to establish the presence of a constant slope and either by theoretical calculation for a given fastener joint combination or by experimental results to determine the desired total rotation from the zero intercept.

The resulting tension levels in the fastener will be much improved over the tension levels achieved with the prior "turn of the nut" method, and the fastener need not be brought to its yield point to determine a level of tension. In addition, the system apparatus is greatly simplified over that required for tension levels other than yield using yield point detection as a reference point. In addition, the system will reduce required torquing power and fastener tensioning time, in that the power and time wasting step of bringing the fastener to its yield point is avoided.

We have described a unique fastener tensioning system and described in detail an embodiment thereof for purposes of assisting one skilled in the art in understanding the nature of the invention and its use. We do not wish to be limited in the scope of our invention by the embodiment described. The invention is limited only by the scope of the claims.

We claim:

1. A method of fastener tensioning in a joint system comprising:
    rotating the fastener;
    monitoring a tension-related function applied to the fastener and a function of rotation applied to the fastener;
    determining the rate of change of the tension-related function per unit of the function of rotation;
    determining when the rate of change of the tension-related function per unit of the function of rotation becomes a constant;
    determining the constant rate;
    determining a starting point for rotation based on a linear projection of the constant rate determined and an instantaneous value of the tension-related function, said starting point corresponding to the zero value of the tension-related function intercept of the function of rotation;
    rotating the fastener a proportionally determined amount of rotation from said starting point; and
    stopping the rotation of the fastener in response to the fastener being rotated the proportionally determined amount.

2. The method of claim 1 wherein:
    the tension-related function is torque.

3. The method of claim 1 wherein:
    the function of rotation is the angular rotation of the fastener.

4. The method of claim 1 wherein:
    the function of rotation is time.

5. The method of claim 1 further comprising:
    the step of checking the constant rate for confirming the constant rate remains constant during the tensioning cycle.

6. The method of claim 5 wherein:
    the latest determined constant rate is utilized to update the tension-related function zero intercept.

7. The method of claim 1 further comprising:
    the step of comparing the determined constant rate with a predetermined constant rate to establish the determined constant rate is within a predetermined range of constant rate as a means of inspection of the joint system.

8. The method of claim 1 wherein:
    the proportionally determined amount of rotation is a predetermined amount of rotation based on known fastener and joint system characteristics.

9. An apparatus for threaded fastener tensioning in a joint system comprising:
    wrench means for rotating the fastener;
    means for measuring a tension-related function applied to the fastener;
    means for measuring a function of rotation applied to the fastener;
    means for receiving the measurement of the tension-related function and the measurement of the function of rotation and for determining a rate of change of said tension-related function with respect to the function of rotation;
    means for determining when said rate of change becomes a constant;
    means for determining the rate of change constant;
    means for determining a starting point for rotation based on a linear projection of the constant rate determined and an instantaneous value of the tension-related function, said starting point corresponding to the zero value of the tension-related function intercept of the function of rotation;
    means for rotating the fastener a proportionally determined amount of rotation from said starting point; and
    means for stopping the rotation of said fastener in response to the fastener being rotated the proportionally determined amount.

10. The apparatus of claim 9 wherein:
    the tension-related function is torque.

11. The apparatus of claim 9 wherein:
    the function of rotation is the angular rotation of the fastener.

12. The apparatus of claim 9 wherein:
    the function of rotation is time.

13. The apparatus of claim 9 further comprising:

means for checking the constant rate determined to confirm the constant rate remains constant during the tensioning cycle.

14. The apparatus of claim 13 wherein:
the latest determined constant rate is utilized to update the tension-related function zero intercept.

15. The apparatus of claim 9 further comprising:
means for comparing the constant rate determined with a predetermined constant rate to establish the determined constant rate within a predetermined range of constant rate as a means of inspection of the joint system.

16. The apparatus of claim 9 wherein:
the proportionally determined amount of rotation is a predetermined amount of rotation based on known fastener and joint system characteristics utilizing the fastener threads as a micrometer.

17. A method for fastener tensioning comprising:
rotating the fastener by power wrench means;
monitoring a tension-related function applied to the fastener and a function of rotation applied to the fastener;
determining when the rate of change of the tension-related function per unit of the function of rotation becomes a constant;
determining the constant rate;
determining a shut off value for said tension-related function utilizing said constant rate and a proportionally predetermined amount of rotation; and
stopping the rotation of the fastener by shutting off said power wrench when said determined shut off value of said tension-related function is reached.

18. The method according to claim 17 wherein:
said tension-related function is the torque applied to the fastener by said power wrench means.

19. The method according to claim 17 wherein:
the function of rotation is the angular rotation of the fastener.

20. The method according to claim 17 wherein:
a predetermined threshold value for said tension-related function is utilized to determine a point at which the tension-related function per unit of function of rotation is a constant.

21. An apparatus for fastener tensioning comprising:
means for rotating the fastener;
means for monitoring a tension-related function applied to the fastener and a function of rotation applied to the fastener;
means for determining when the rate of change of the tension-related function per unit of the function of rotation becomes a constant;
means for determining the constant rate;
means for determining a shut off value of said tension-related function utilizing said constant rate and a proportionally predetermined amount of rotation; and
means for stopping the rotation of the fastener when said determined shut off value of said tension-related function is reached.

* * * * *